June 10, 1952 W. W. SALISBURY 2,599,944
ABSORBENT BODY FOR ELECTROMAGNETIC WAVES
Filed May 11, 1943

INVENTOR
WINFIELD W. SALISBURY

BY

ATTORNEY

Patented June 10, 1952

2,599,944

UNITED STATES PATENT OFFICE 2,599,944

ABSORBENT BODY FOR ELECTROMAGNETIC WAVES

Winfield W. Salisbury, Arlington, Mass., assignor, by mesne assignments, to the United States of America as represented by the Secretary of the Navy Application May 11, 1943, Serial No. 486,608

23 Claims. (Cl. 250—16)

This invention relates to an absorbent body for high-frequency electromagnetic radiation and has for its principal object to provide a means to prevent or reduce reflection of electromagnetic radiation from surfaces.

Another object of the invention is to provide a composite surface which may be applied to almost any object to render it non-reflective for electromagnetic radiation of a predetermined high frequency.

Another object of the invention is to provide a simple and easily constructed absorbent chamber which has inner walls substantially non-reflective to electromagnetic radiation of a predetermined wave length so that the chamber may be used to test various devices for producing electromagnetic radiation, or as a termination for concentric lines or wave guides carrying electric energy at high frequencies.

Still another object of the invention is to provide in front of a given surface a means to intercept and reflect that portion of the electromagnetic radiation of a given frequency directed towards said surface, which will approximately equal the portion of the remaining radiation reflected from said surface, A further object is to separate the means and the surface specified in the paragraph immediately above in such a manner that the reflected radiation from said surface will be 180° out of phase with the reflected radiation from said means at a point in space in front of said means.

Other objects and objects relating to various uses of the invention and the arrangement and assembly of the various parts will be apparent as the description of the invention proceeds.

Several embodiments of the invention are illustrated in the accompanying drawings in which.

Figure 5:
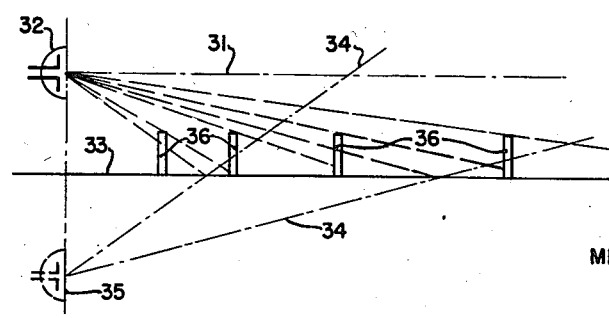
Figure 4:
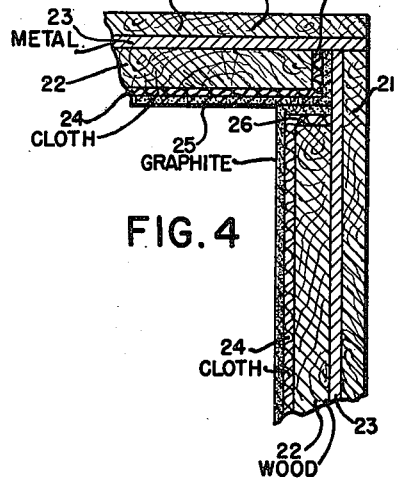
Figure 3:
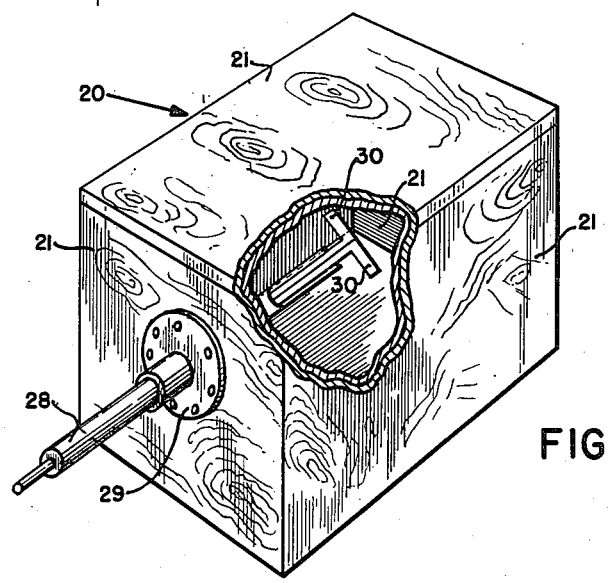
Fig. 3 is a perspective view of an absorbent chamber utilizing the construction of Fig. 1 and indicated as a termination for a coaxial line.

Fig. 4 is a sectional view through one of the corners of the absorbent chamber of Fig. 3 showing the construction of the composite surface of the interior thereof, and Fig. 5 is a diagram illustrating another use of the invention employing a plurality of the absorbent surfaces mounted in spaced relation upon a given surface to prevent undesirable reflection of electromagnetic waves from that surface.

It is often desirable to prevent the reflection of electromagnetic radiation from surfaces or objects. For instance, where the field characteristics of an electromagnetic wave radiator, such as a dipole antenna or a wave guide are to be tested, it is more convenient to make such tests in the laboratory than in the open air where they are usually made, because of the necessity of eliminating reflections. It is also often desirable to provide a dummy antenna whereby a transmitter may be operated for test purposes and the radiation entirely absorbed. It may also be highly advantageous to protect an airplane or ship or other object against radio echo detection systems of the enemy by treating the surface thereof or a large portion of it so as to prevent reflection of electromagnetic waves of the particular wave length used. I have provided a very simple and easily constructed composite surface for absorbing electromagnetic radiation, thus accomplishing these and other desirable results.

Figure 1:
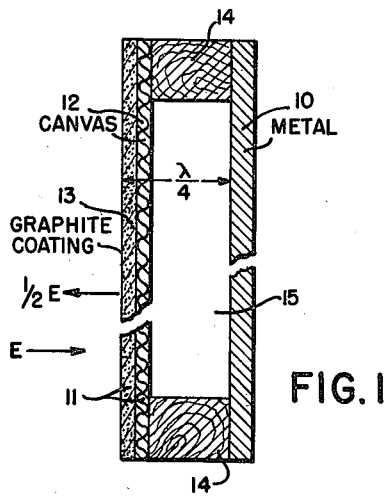
Fig. 1 is a sectional view through a composite surface constructed in accordance with the invention.

In its broadest aspect the composite surface of the invention is illustrated in Fig. 1, and comprises a surface 10 which is a good reflector for any of the electromagnetic radiation, indicated at E, which reaches it. A screen 11 which has low conductivity is spaced in front of the reflecting surface 10. This screen permits some of the radiation to pass through it and to reach the surface 10, while it reflects the remainder of the radiation. The screen 11 is spaced from the reflecting surface 10 a distance equal to an odd quarter wave length of the particular electromagnetic radiation which the surface is designed to absorb. For practical purposes it may be preferable to space the screen 11 from the reflecting surface 10 a distance equal to one-quarter wave length, since this brings the screen 11 as close as possible to the reflecting surface 10. The screen 11 is designed so that the radiation reflected from it will equal, or approach as nearly as possible, the radiation which has passed through it and is reflected from the reflecting surface 10. When such is the case and the proper spacing is used, at a point in front of or external to said surface and screen, the electric and magnetic field from the screen 11 will be 180° out of phase with the electric and magnetic field of the radiation reflected from the surface 10 and will cancel it entirely or greatly reduce it.

Such a composite surface acts as if it had a Q (ratio of stored energy to dissipated energy) of one and will absorb a broad band of frequencies. Also it will absorb radiation directed at it through a wide angle.

The reflecting surface 10 is preferably made as nearly a perfect reflector as possible, and since metal is substantially a perfect reflector, any kind of a metal surface may be used for this purpose. The screen 11, however, must be carefully chosen. It should be thin as compared to the skin depth of currents in the material of the screen and hence needs additional support which may be supplied by some dielectric material. A thin metal coat sputtered on to a dielectric sheet may provide a suitable screen, or a fabric coated with some conducting material, as, for instance, the rubberized conducting fabric manufactured by the United States Rubber Company. I have found that canvas coated with colloidal solution of graphite to a certain predetermined thickness makes a desirable screen to use for the purpose of the invention. The solution of graphite could also be applied to other dielectric materials, such as wood.

It can be shown mathematically that, if the surface 10 is substantially a perfect reflector, the conductivity and thickness of the screen 11 should bear a certain relation to the impedance of the medium in which the invention is to be used to plane electromagnetic waves. This impedance can be represented by the ratio, $$\frac{377}{\sqrt{\epsilon_R}}$$

where $\epsilon_R$ equals the relative dielectric constant of the medium. The relation then between the thickness and conductivity of the screen 11 may be shown mathematically to be represented by the following equation:

$$\frac{1}{v\delta} = \frac{377}{\sqrt{\epsilon_R}}$$

where $v$ equals the conductivity and $\delta$ equals the thickness of the conducting material.

For empty space the value of $\sqrt{\epsilon_R}$ equals 1 and this gives:

$$\frac{1}{v\delta} = 377 \text{ ohms}$$

The invention may be found most useful in absorbing or preventing the reflection of electromagnetic waves in empty space. However, it will be understood that if the invention is to be used in some other medium, the value of 377 ohms will be replaced by another value determined by the relative dielectric constant of that particular medium.

It is difficult to measure the conductivity and the thickness of the screen 11, but the expression $$\frac{1}{v\delta}$$

for a conducting screen may be very easily obtained by connecting in a circuit two opposite sides of a square of the screen, which may be any size, and measuring the resistance across these two sides. This resistance will be the same for any size square of the same character and thickness of conducting material, and such screen will be suitable to use with a perfect reflector if its resistance equals the right-hand side of the first equation given above, which, in the case of empty space is 377 ohms. However, it is not necessary that these exact figures be obtained in order to operate the invention. Greater or less conductivity of the screen 11 may still produce satisfactory results, depending upon the desired accuracy of the measurements to be made or the proportion of radiation required to be absorbed. Similarly, the spacing of the screen 11 from the reflector 10 may vary somewhat from the exact quarter wave length measurement without substantially altering the results obtained. Cloths coated with graphite with a resistance from 350 to 400 ohms across the square have been found satisfactory in substantially empty space.

In Fig. 1 the screen 11 is shown made of a sheet of canvas 12 provided with a graphite coating 13. The canvas sheet 12 is shown separated from the reflector 10 by a plurality of wooden spacers 14, the remainder of the space 15 being air.

Figure 2:
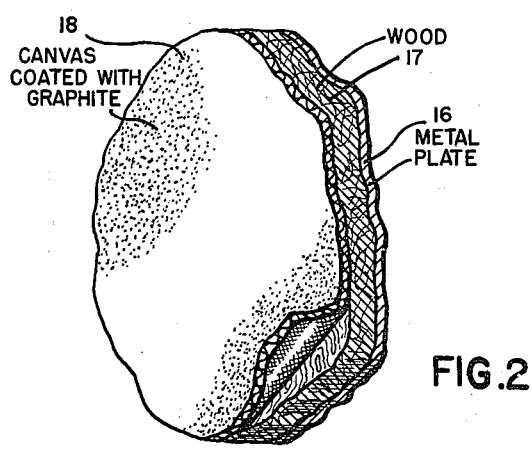
Fig. 2 is a perspective view of a fragmentary portion of a modified form of the composite surface of the invention.

In Fig. 2 the composite surface is shown with a solid dielectric separating the reflector and the screen. In this construction a metal plate 16 is secured in any desirable manner to a wooden board 17 which may conveniently be plywood of the proper thickness. On the surface of the plywood is attached the canvas 18 treated with the graphite as above described. This construction makes a very compact composite surface, since the metal plate 16 may be rigidly secured to the wood and the canvas coated with graphite may be stretched tightly over the opposite face of the wood so as to give a uniform spacing. Other materials might be used as a dielectric between the metal plate and the screen, as long as the distance is kept equal to $$\frac{\lambda}{4\sqrt{\epsilon_D}}$$

where $\lambda$ represents the wave length and $\epsilon_D$ represents the relative dielectric constant of the dielectric spacer.

In Figs. 3 and 4 I have shown an absorbent chamber using for interior walls the composite structure illustrated in Fig. 2. The box 20 of these figures may be of any size desired. All six sides are shown constructed similarly, the construction being illustrated in Fig. 4. The sides 21 of the box are made of wood and each side is provided with a lining formed of another piece of wood 22 cut to fit the inside of the box and provided on its outer surface with a sheet of metal 23 and on its inner surface with a sheet of cloth 24 suitably treated with graphite 25. As indicated, the cloth may pass around the ends 26 of the wooden pieces 22 so as to secure it tightly against the wood, as by tacking. The metal sheets 23 may be screwed or otherwise secured to the wood members 22. The box is put together at the corners in such a way that the interior surface consists solely of the graphite-coated cloth. For this purpose, adjoining wooden members 22 are caused to overlap, as indicated in Fig. 4.

The box 20 is shown with wooden outer sides 21. Thus constructed, thin metal sheets 23 may be used, the outer wooden sides 21 serving to protect the metal against physical damage. If desired, however, the wooden sides 21 may be dispensed with, and the metal sheets 23 may be heavier and may form the structure of the box.

In Fig. 3 the use of the box 20 as a termination for a coaxial line is indicated. A hole is provided in one side of the box and a coaxial line 28 passes through the hole, a suitable flange 29 being provided which screws on to the wooden side 21 to secure the coaxial line rigidly in position extending through the center of the hole. The coaxial line is indicated as provided with a dipole antenna 30 by means of which the energy carried by the line is radiated as electromagnetic waves inside of the box. Since the inner walls of the box have the non-reflecting characteristic already described, all of the energy will thus be absorbed, and will be dissipated as heat, the large surfaces of the metal sheets 23 being sufficient to radiate the heat thus formed.

The box may be used equally well as a termination for a wave guide, and, in either case, where sufficient energy is to be absorbed, water may be used behind the metal sheets to carry away the heat.

The box 20 of Fig. 3 may also be used for test purposes to determine standing waves, field strength, and the like. For this purpose another hole may be provided in the opposite wall or in one of the other sides of the box through which an energy pick-up device may be inserted to intercept radiation from the particular radiator inserted through the front. In this manner accurate measurements may be made without substantial interference from reflection from the inner walls of the box.

In Fig. 5 another use of the composite absorbing surface of the invention is illustrated. Here it is desired to direct a beam of electromagnetic radiation whose axis has been indicated at 31 from a directive antenna system 32 substantially parallel or at a slight inclination to a surface 33 which represents the earth or other surface above which the antenna system is positioned. When this is attempted normally, reflection from the surface 33 will cause the beam to be deflected upwardly as indicated by the dot-and-dash line 34, as though radiation were coming from an image 35 of the antenna system situated below the surface 33 a distance equal to the distance of the antenna system 32 above the surface. By placing a plurality of the composite absorbing surfaces of the invention, indicated at 36, at spaced intervals below the beam and in front of the antenna system 32, no radiation from the antenna system can strike the surface 33, and all radiation directed towards the surface 33 will be absorbed in the composite absorbing surfaces 36. The spacing of these surfaces will depend, of course, on their size, as will be apparent from an inspection of Fig. 5, and while they have been shown normal to the surface 33, they may be supported at any angle, as, for instance, normal to the electromagnetic radiation. Any surface may be treated in this manner to prevent reflection of radiation.

It will thus be seen that I have provided a composite surface which is substantially non-reflecting to electromagnetic waves of a particular wave length, and that substantially any surface may be made non-reflecting to particular waves by providing it with a spaced screen which will reflect waves in such a manner as to cancel the waves reflected from the surface proper. It will also be seen that an absorbent chamber using the particular composite surface may be easily and inexpensively constructed for providing a termination for transmission lines or for making measurements of radiation.

Many different modifications of the invention may be made without departing from the spirit of the invention, and I do not therefore desire to limit myself to what has been shown and described except as such limitations occur in the appended claims.

What I desire to claim and secure by Letters Patent is:

1. A composite surface substantially non-reflective to short electromagnetic waves of a particular frequency, which comprises, in combination, a substantially perfect reflecting surface for said electromagnetic waves, and a conducting screen spaced from said reflecting surface by a medium whose relative dielectric constant equals one at a distance substantially equal to an odd quarter wave length of said electromagnetic waves measured through said dielectric, the character of said screen being such that it substantially satisfies the equation $$\frac{1}{v\delta} = \frac{377}{\sqrt{\epsilon_R}}$$

where $v$ equals the conductivity of said screen, $\delta$ equals the thickness thereof, and $\epsilon_R$ equals the relative dielectric constant of the medium in which said surface is to be used.

2. A composite surface substantially non-reflective to short electromagnetic waves of a particular frequency, which comprises, in combination, a substantially perfect reflecting surface for said electromagnetic waves, and a conducting screen spaced from said reflecting surface by a medium whose relative dielectric constant equals one at a distance substantially equal to an odd quarter wave length of said electromagnetic waves measured through said dielectric, the character of said screen being such that it substantially satisfies the equation $$\frac{1}{v\delta} = 377 \text{ ohms}$$

where $v$ equals the conductivity of said screen and $\delta$ equals the thickness thereof.

3. An absorbing chamber for electromagnetic radiation of a particular frequency which comprises, in combination, a container having substantially all of the interior walls thereof formed of a composite surface comprising an outer surface which is substantially a perfect reflector for the particular electromagnetic waves to be used with the chamber, and an inner conducting screen separated from said reflecting surface by a medium whose relative dielectric constant equals one at a distance substantially equal to an odd quarter wave length of said radiation, the conductivity of said screen being such as substantially to satisfy the equation $$\frac{1}{v\delta} = 377 \text{ ohms}$$

where $v$ equals the conductivity of said screen and $\delta$ equals the thickness thereof.

4. A composite surface which is substantially non-reflecting for electromagnetic radiation of a predetermined short wave length, which comprises, in combination, a surface which is substantially a perfect reflector for said raditaion, a conductive screen spaced from said surface, and having such conductivity and thickness that it will substantially satisfy the equation $$\frac{1}{v\delta} = 377 \text{ ohms}$$

where $v$ equals the conductivity of said screen and $\delta$ equals the thickness thereof, and a solid dielectric between said screen and said surface, the spacing between said surface and said screen being substantially equal to an odd quarter wave length of said radiation measured through said dielectric.

5. An absorbing chamber for electromagnetic radiation of a predetermined short wave length, which comprises, in combination, a container having interior composite walls each of which comprises a surface which is substantially a perfect reflector for said radiation, a conductive screen spaced a predetermined distance from said surface, and a solid dielectric between said surface and screen, the distance between said surface and the screen being substantially an odd quarter wave length of said radiation, as measured through said dielectric, said conducting surface being such that it substantially satisfies the equation $$\frac{1}{v\delta} = 377 \text{ ohms}$$

where $v$ equals the conductivity of said conducting screen and $\delta$ equals the thickness thereof.

6. An absorbing chamber for electromagnetic radiation of a predetermined short wave length, which comprises, in combination, a metal box, conductive screens spaced from the interior walls of said box a distance substantially equal to an odd quarter wave length of said radiation, each of said conducting screens having such characteristics that it will substantially satisfy the equation $$\frac{1}{v\delta} = 377 \text{ ohms}$$

where $v$ equals the conductivity of said screen and $\delta$ equals the thickness thereof, and means to support each of said screens from its associated wall.

7. An absorbing chamber for electromagnetic radiation of a predetermined short wave length which comprises, in combination, a metal container, an inner lining of wood in said container, a covering of cloth on each inner wooden surface, a coating of colloidal graphite solution on each of said cloth coverings, the distance of said graphite coating from said metal container surface being substantially equal to an odd quarter wave length of said radiation as measured through said wooden lining, the amount of colloidal graphite solution on said cloth covering being sufficient substantially to satisfy the equation $$\frac{1}{v\delta} = 377 \text{ ohms}$$

where $v$ equals the conductivity of said graphite surface and $\delta$ equals the thickness thereof.

8. An absorbing chamber for short wave length electromagnetic waves of a particular frequency comprising, in combination, a container having substantially all of the walls thereof formed of a means for reflecting said electromagnetic waves, and means spaced from said reflecting means a distance substantially equal to an odd quarter wave length of said electromagnetic waves, the composition of said spaced means being such that the radiation reflected from it will be substantially equal to the radiation passing through it.

9. An absorbing chamber for short wave length electromagnetic radiation of a particular frequency, comprising, in combination, a container having all of the walls thereof formed of a substantially perfect reflecting surface for said electromagnetic waves, and a conducting screen spaced from said reflecting surface a distance substantially equal to an odd quarter wave length of said electromagnetic waves, the composition of said screen being such that the radiation reflected from it will substantially equal the radiation passing through it.

10. A composite surface which is substantially non-reflecting for electromagnetic waves of a particular short wave length which comprises, in combination, a substantially perfect reflecting surface for said electromagnetic waves, and a conducting screen of graphite spaced from said reflecting surface by a medium whose relative dielectric constant equals one at a distance substantially equal to an odd quarter wave length of said electromagnetic waves as measured through said medium, the character of said screen being such that it substantially satisfies the equation $$\frac{1}{V\delta} = \frac{377}{\sqrt{\epsilon_R}}$$

where $V$ equals the conductivity of said screen, $\delta$ equals the thickness thereof, and $\epsilon_R$ equals the relative dielectric constant of the medium in which said surface is to be used.

11. A composite surface which is substantially non-reflecting for electromagnetic waves of a particular short wave length which comprise, in combination, a substantially perfect reflecting surface for said electromagnetic waves, and a cloth screen coated with a colloidal solution of graphite spaced from said reflecting surface by a medium whose relative dielectric constant equals one at a distance substantially equal to an odd quarter wave length of said electromagnetic waves as measured through said medium, the character of said screen being such that it substantially satisfies the equation $$\frac{1}{V\delta} = 377 \text{ ohms}$$

where $V$ equals the conductivity of said screen and $\delta$ equals the thickness thereof.

12. A composite surface which is substantially non-reflecting for electromagnetic waves of a particular short wave length which comprises, in combination, a substantially perfect reflecting surface for said electromagnetic waves, a conducting screen of graphite, the character of said screen being such that it substantially satisfies the equation $$\frac{1}{V\delta} = \frac{377}{\sqrt{\epsilon_R}}$$

where $V$ equals the conductivity of said screen, $\delta$ equals the thickness thereof, and $\epsilon_R$ equals the relative dielectric constant of the medium in which the surface is to be used, and a dielectric between said reflecting surface and said conducting screen of such a thickness that the spacing between said surface and said screen is equal to $$\frac{\lambda}{4\sqrt{\epsilon_D}}$$

where $\lambda$ equals the wave length of said electromagnetic waves and $\epsilon_D$ equals the relative dielectric constant of said dielectric.

13. An absorbing chamber for electromagnetic radiation of a predetermined short wave length, which comprises, in combination, a container having interior composite walls each of which comprises a surface which is substantially a perfect reflector for said radiation, a conducting screen spaced a predetermined distance from said surface, the character of said screen being such that it substantially satisfies the equation $$\frac{1}{V\delta} = \frac{377}{\sqrt{\epsilon_R}}$$

where $V$ equals the conductivity of said screen, $\delta$ equals the thickness thereof, and $\epsilon_R$ equals the relative dielectric constant of the medium in which the surface is to be used, and a dielectric between said reflecting surface and said conducting screen of such a thickness that the spacing between said surface and said screen is equal to $$\frac{\lambda}{4\sqrt{\epsilon_D}}$$

where $\lambda$ equals the wave length of said electromagnetic waves and $\epsilon_D$ equals the relative dielectric constant of said dielectric.

14. A composite surface substantially non-reflective to electromagnetic waves of a particular frequency, which comprises, in combination, means for reflecting said electromagnetic waves, and a conducting screen spaced from said reflecting means a distance substantially equal to an odd quarter wave length of said electromagnetic waves as measured in the medium separating said reflecting means and said screen, the composition of said screen being such that the resistance per square of said screen is substantially equal to the characteristic impedance to electromagnetic waves of the medium through which said electromagnetic waves are transmitted.

15. A composite surface substantially nonreflective to electromagnetic waves of a particular frequency, which comprises, in combination, means for reflecting said electromagnetic waves, and a screen separated from said reflecting means by a dielectric medium a distance equal to substantially a quarter wave length as measured in said dielectric medium, the composition of said screen being such that the resistance per square of said screen is substantially equal to the characteristic impedance to electromagnetic waves of the medium through which said electromagnetic waves are transmitted.

16. An absorbing chamber for short wave length electromagnetic waves of a particular frequency comprising, in combination, a chamber having substantially all of the walls thereof formed of a means for reflecting said electromagnetic waves, and a screen spaced from said reflecting surface a distance substantially equal to an odd quarter wave length of said electromagnetic waves as measured within the medium separating said reflecting means and said screen, the composition of said screen being such that the resistance per square of said screen is substantially equal to the characteristic impedance to electromagnetic waves of the medium through which said electromagnetic waves are transmitted.

17. An absorbing chamber for short wave length electromagnetic waves of a particular frequency comprising in combination, a chamber having substantially all of the walls thereof formed of a means for reflecting said electromagnetic waves, and a screen spaced from said reflecting surface by a dielectric medium a distance equal to an odd quarter wave length of said electromagnetic waves as measured within the dielectric medium, the composition of said screen being such that the resistance per square of said screen is substantially equal to the characteristic impedance to electromagnetic waves of the medium through which said electromagnetic waves are transmitted.

18. A composite surface substantially non-reflective to short electromagnetic waves of a particular frequency, which comprises, in combination, a substantially perfect reflecting surface for said electromagnetic waves, and a conducting screen spaced from said reflecting surface by a dielectric a distance substantially equal to an odd quarter wave length of said electromagnetic waves measured through said dielectric, the character of said screen being such that it substantially satisfies the equation $$\frac{1}{v\delta} = \frac{377}{\sqrt{\epsilon_R}}$$

where $v$ equals the conductivity of said screen, $\delta$ equals the thickness thereof, and $\epsilon_R$ equals the relative dielectric constant of the medium in which said surface is to be used.

19. A composite surface substantially non-reflective to short electromagnetic waves of a particular frequency, which comprises, in combination, a substantially perfect reflecting surface for said electromagnetic waves, and a conducting screen spaced from said reflecting surface by a dielectric a distance substantially equal to an odd quarter wave length of said electromagnetic waves measured through said dielectric, the character of said screen being such that it substantially satisfies the equation $$\frac{1}{v\delta} = 377 \text{ ohms}$$

where $v$ equals the conductivity of said screen and $\delta$ equals the thickness thereof.

20. An absorbing chamber for electromagnetic radiation of a particular frequency which comprises, in combination, a container having substantially all of the interior walls thereof formed of a composite surface comprising an outer surface which is substantially a perfect reflector for the particular electromagnetic waves to be used with the chamber, and an inner conducting screen separated from said reflecting surface by a dielectric a distance substantially equal to an odd quarter wave length of said radiation, the conductivity of said screen being such as substantially to satisfy the equation $$\frac{1}{v\delta} = 377 \text{ ohms}$$

where $v$ equals the conductivity of said screen and $\delta$ equals the thickness thereof.

21. A structure substantially non-reflecting to electromagnetic waves of predetermined frequency propagated in free space to which the structure is exposed, comprising a facing member which is thin relative to the wavelength in space of said electromagnetic waves and is constructed of electrically-resistive material having electric resistance of the order of $120\pi$ ohms per unit length of unit width of said material, and a backing member having a metal surface disposed behind and physically separated from said facing member by an insulating medium having a thickness corresponding substantially to one-quarter of the wavelength of the said electromagnetic waves in said medium.

22. A structure substantially non-reflecting to electromagnetic waves of predetermined frequency as claimed in claim 21, wherein the facing member is separated from the metal surface by insulation medium the dielectric constant of which is greater than unity and the thickness of which is substantially equal to the quotient of one-quarter of a wavelength of the electromagnetic waves in space and the square root of the dielectric constant of said insulation medium.

23. A spacious chamber the enclosure for which is substantially non-reflecting to electromagnetic waves substantially of a predetermined frequency propagated in the free space of the chamber and which enclosure comprises a backing structure, a metal inner lining for the backing structure, and a facing sheet which is thin relative to the wavelength in space of said electromagnetic waves and is formed of material having electric resistance of the order of $120\pi$ ohms per unit length of unit width of the material, which facing sheet is maintained in spaced relationship to the lining by an insulating medium having a thickness corresponding substantially to one-quarter of the wavelength of the waves in said medium.

WINFIELD W. SALISBURY.

REFERENCES CITED

The following references are of record in the file of this patent:

UNITED STATES PATENTS

| Number | Name | Date |
| --- | --- | --- |
| 1,928,408 | Clavier | Sept. 26, 1933 |
| 2,000,806 | White | May 7, 1935 |
| 2,293,839 | Linder | Aug. 25, 1942 |
| 2,337,612 | Linder | Dec. 28, 1943 |
| 2,489,288 | Hansen | Nov. 29, 1949 |

FOREIGN PATENTS

| Number | Country | Date |
| --- | --- | --- |
| 802,728 | France | June 13, 1936 |
| 668,231 | Germany | Nov. 28, 1938 |